United States Patent
Filipovich

[11] Patent Number: 6,075,644
[45] Date of Patent: Jun. 13, 2000

[54] PANORAMIC NIGHT VISION GOGGLES

[75] Inventor: Danny Filipovich, Lincolnwood, Ill.

[73] Assignee: Night Vision General Partnership, Lincolnwood, Ill.

[21] Appl. No.: 08/771,205

[22] Filed: Dec. 20, 1996

[51] Int. Cl.[7] .............................. G02B 23/00; G02B 27/02
[52] U.S. Cl. ........................ 359/407; 359/353; 359/429; 359/480
[58] Field of Search ................................... 359/373–378, 359/399–407, 429–430, 480–482, 503–506, 618–621, 630, 850–857, 860; 250/214 VT, 221

[56] References Cited

U.S. PATENT DOCUMENTS

| | | | |
|---|---|---|---|
| 841,262 | 1/1907 | Martin | 359/413 |
| 2,685,230 | 8/1954 | Baker | 359/722 |
| 2,710,560 | 6/1955 | Thompson | 359/431 |
| 3,058,021 | 10/1962 | Dunn | 313/527 |
| 3,152,214 | 10/1964 | Korones et al. | 359/364 |
| 3,257,904 | 6/1966 | Scidmore et al. | 313/524 |
| 3,394,975 | 7/1968 | Coniglio | 359/355 |
| 3,400,291 | 9/1968 | Sheldon | 313/528 |
| 3,402,977 | 9/1968 | Russa et al. | 359/407 |
| 3,409,343 | 11/1968 | Zapp | 359/431 |
| 3,443,105 | 5/1969 | Scidmore et al. | 250/214 VT |
| 3,450,480 | 6/1969 | Chitayat | 359/373 |
| 3,454,322 | 7/1969 | Scidmore et al. | 359/364 |
| 3,454,773 | 7/1969 | Bulthuis et al. | 250/214 VT |
| 3,464,757 | 9/1969 | Schmidt et al. | 359/353 |
| 3,500,048 | 3/1970 | Menke | 250/333 |
| 3,502,387 | 3/1970 | Hadley | 359/429 |
| 3,509,344 | 4/1970 | Bouwers | 250/333 |
| 3,529,882 | 9/1970 | Schmidt | 359/353 |
| 3,549,231 | 12/1970 | Scidmore et al. | 313/524 |

(List continued on next page.)

FOREIGN PATENT DOCUMENTS

| | | |
|---|---|---|
| 0 025 398 | 3/1981 | European Pat. Off. . |
| 0 029 005 | 5/1981 | European Pat. Off. . |
| 0 066 402 | 12/1982 | European Pat. Off. . |
| 0 134 116 | 8/1984 | European Pat. Off. . |
| 0 252 200 | 1/1988 | European Pat. Off. . |
| 1463509 | 1/1966 | France . |
| 1480611 | 5/1966 | France . |
| 1 128 678 | 4/1962 | Germany . |
| 1 294 059 | 4/1969 | Germany . |
| 2-197810 | 8/1990 | Japan .................................. 359/402 |
| 3-269937 | 12/1991 | Japan . |
| 913894 | 12/1962 | United Kingdom . |
| 1010126 | 11/1965 | United Kingdom . |
| 2 006 463 | 5/1979 | United Kingdom . |
| 2 254160 | 9/1992 | United Kingdom . |
| WO86/05281 | 9/1986 | WIPO . |
| WO87/00639 | 1/1987 | WIPO . |
| WO 91/09334 | 6/1991 | WIPO .................................. 359/402 |

OTHER PUBLICATIONS

"Modular, Ejection–Rated, Lowprofile, Imaging for Night (MERLIN) Aviator Goggle," published by ITT Defense Technology Corporation, Sep., 1989.

*Primary Examiner*—Thong Nguyen
*Attorney, Agent, or Firm*—Daniel L. Boots; Bingham Summers Welsh & Spilman

[57] ABSTRACT

A binocular-like vision system for enabling an observer to view an object. The system includes an input end that receives light from the object and an optical transfer system that receives the light received from the input end and transfers the received light to an image intensifier which intensifies the received light, wherein the intensified received light is transferred to and transmitted out of an output end of the system, wherein the light transmitted out of the output end forms a field of view of the object that is greater than a 60 degree horizontal field of view.

32 Claims, 10 Drawing Sheets

U.S. PATENT DOCUMENTS

| | | | |
|---|---|---|---|
| 3,712,702 | 1/1973 | Schmidt | 313/524 |
| 3,781,560 | 12/1973 | DeBurgh et al. | 250/333 |
| 3,782,832 | 1/1974 | Hacskaylo | 356/153 |
| 3,787,688 | 1/1974 | Stone | 250/214 VT |
| 3,865,468 | 2/1975 | Holcomb | 359/481 |
| 3,907,401 | 9/1975 | Liu | 359/357 |
| 3,910,676 | 10/1975 | Fojtik et al. | 359/504 |
| 3,915,547 | 10/1975 | Scidmore et al. | 359/357 |
| 3,977,855 | 8/1976 | Cole | 65/410 |
| 4,000,419 | 12/1976 | Crost et al. | 250/214 VT |
| 4,028,544 | 6/1977 | Jourdan et al. | 250/204 |
| 4,037,921 | 7/1977 | Cox | 313/524 |
| 4,076,978 | 2/1978 | Brennan et al. | 250/214 VT |
| 4,124,798 | 11/1978 | Thompson | 250/214 VT |
| 4,145,142 | 3/1979 | Mikeman | 356/229 |
| 4,154,502 | 5/1979 | Siegmund | 385/116 |
| 4,178,075 | 12/1979 | Rogers | 359/648 |
| 4,183,482 | 1/1980 | Jozwiak | 244/3.16 |
| 4,196,969 | 4/1980 | Itoh | 359/680 |
| 4,205,894 | 6/1980 | Filipovich et al. | 359/400 |
| 4,232,222 | 11/1980 | Deltrap | 250/333 |
| 4,266,129 | 5/1981 | Versteeg et al. | 250/330 |
| 4,266,848 | 5/1981 | Schlegel | 313/524 |
| 4,266,873 | 5/1981 | Hacskaylo et al. | 356/251 |
| 4,323,298 | 4/1982 | Brennan | 359/411 |
| 4,361,378 | 11/1982 | Freeman | 359/407 |
| 4,376,889 | 3/1983 | Swift | 250/214 VT |
| 4,449,787 | 5/1984 | Burbo et al. | 313/524 |
| 4,463,252 | 7/1984 | Brennan et al. | 250/214 VT |
| 4,467,190 | 8/1984 | Hadani | 250/214 VT |
| 4,468,101 | 8/1984 | Ellis | 313/524 |
| 4,483,587 | 11/1984 | Michon | 356/373 |
| 4,563,061 | 1/1986 | Ellis | 359/364 |
| 4,572,625 | 2/1986 | Arndt et al. | 356/4.01 |
| 4,573,773 | 3/1986 | Arndt et al. | 359/403 |
| 4,576,432 | 3/1986 | Ruger | 374/124 |
| 4,582,400 | 4/1986 | Lough | 313/524 |
| 4,629,295 | 12/1986 | Vogl | 359/364 |
| 4,641,931 | 2/1987 | Loy | 359/420 |
| 4,653,879 | 3/1987 | Filipovich | 250/330 |
| 4,655,562 | 4/1987 | Kreitzer et al. | 250/330 |
| 4,660,943 | 4/1987 | Ellis | 359/362 |
| 4,697,783 | 10/1987 | Kastendieck et al. | 248/205.1 |
| 4,755,664 | 7/1988 | Holmes et al. | 250/214 VT |
| 4,758,076 | 7/1988 | Loy et al. | 313/524 |
| 4,775,217 | 10/1988 | Ellis | 313/524 |
| 4,782,832 | 11/1988 | Trimble et al. | 128/207.18 |
| 4,792,673 | 12/1988 | Blackler | 250/214 VT |
| 4,806,007 | 2/1989 | Bindon | 359/424 |
| 4,818,065 | 4/1989 | Ziph et al. | 359/630 |
| 4,822,994 | 4/1989 | Johnson et al. | 250/214 VT |
| 4,826,302 | 5/1989 | Afsenius | 313/524 |
| 4,828,378 | 5/1989 | Ellis | 359/400 |
| 4,843,229 | 6/1989 | Reed et al. | 250/214 VT |
| 4,849,755 | 7/1989 | Benas | 340/946 |
| 4,862,164 | 8/1989 | Croley et al. | 340/952 |
| 4,863,269 | 9/1989 | Ellis | 356/251 |
| 4,904,049 | 2/1990 | Hegg | 385/120 |
| 4,907,296 | 3/1990 | Blecha | 2/6.2 |
| 4,912,334 | 3/1990 | Anderson | 250/495.1 |
| 4,915,487 | 4/1990 | Riddell, III et al. | 359/630 |
| 4,918,752 | 4/1990 | Briggs | 2/6.2 |
| 4,922,550 | 5/1990 | Verona et al. | 2/6.2 |
| 4,927,237 | 5/1990 | Hart | 359/894 |
| 4,934,273 | 6/1990 | Endriz | 102/336 |
| 4,934,793 | 6/1990 | Klein | 349/67 |
| 4,961,278 | 10/1990 | Johnson et al. | 42/101 |
| 4,961,626 | 10/1990 | Fournier, Jr. et al. | 359/630 |
| 4,987,608 | 1/1991 | Cobb | 2/6.2 |
| 5,000,556 | 3/1991 | Katsuma | 359/407 |
| 5,079,416 | 1/1992 | Filipovich | 250/214 VT |
| 5,084,780 | 1/1992 | Phillips | 359/350 |
| 5,093,567 | 3/1992 | Stavely | 250/221 |
| 5,229,598 | 7/1993 | Filipovich | 250/214 VT |
| 5,254,852 | 10/1993 | Filipovich et al. | 250/214 VT |
| 5,282,082 | 1/1994 | Espie et al. | 359/359 |
| 5,416,315 | 5/1995 | Filipovich | 250/214 VT |
| 5,485,306 | 1/1996 | Kiunke et al. | 359/403 |
| 5,579,158 | 11/1996 | Padula | 359/407 |
| 5,652,679 | 7/1997 | Freeman | 359/407 |
| 5,666,227 | 9/1997 | Ben-Ghiath | 359/557 |

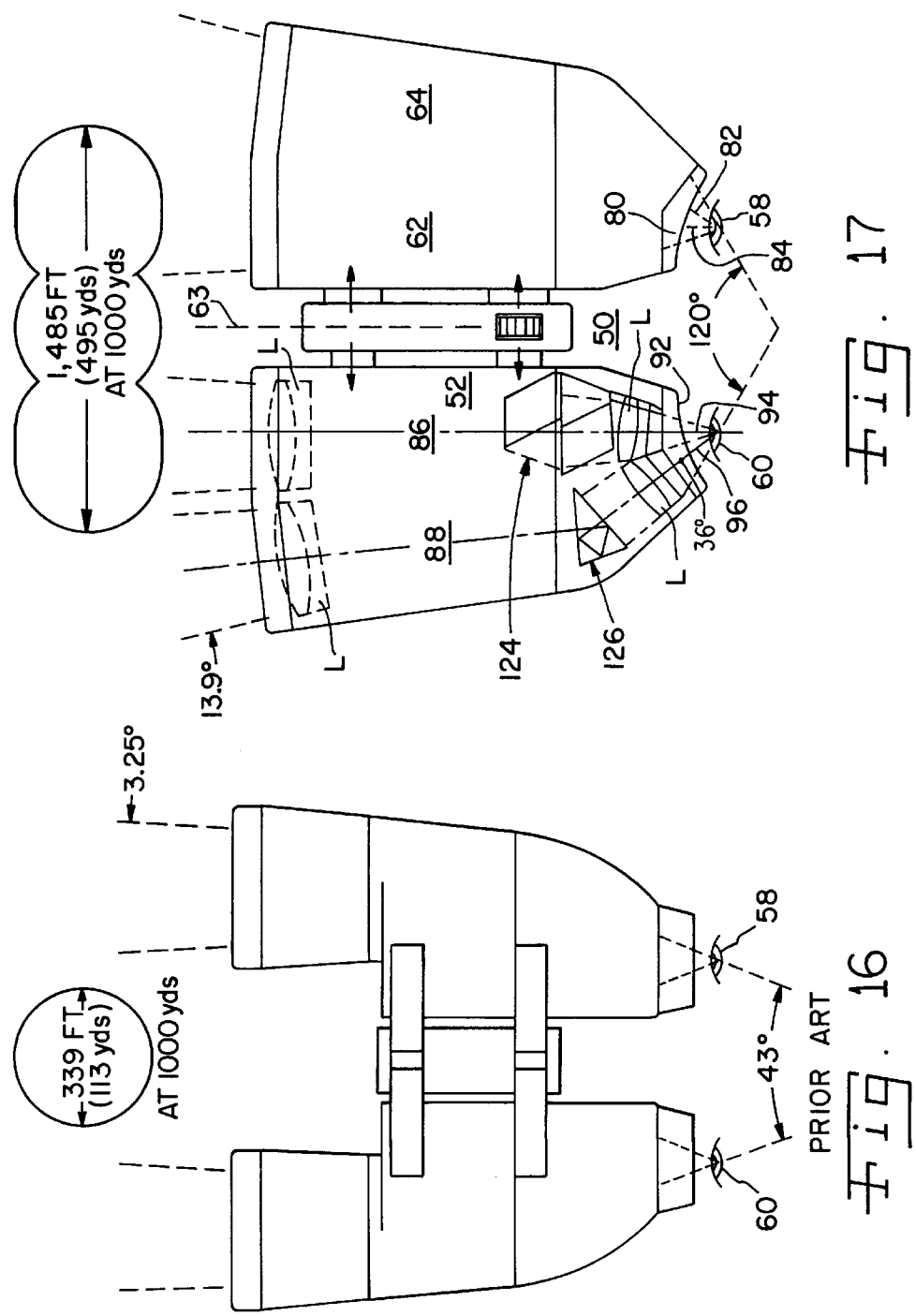

PANORAMIC NIGHT VISION GOGGLES

BACKGROUND OF THE INVENTION

1. Field of the Invention

This invention relates to a binocular-type viewing system having a substantially enlarged field of view that can be used in day and/or night time conditions.

2. Discussion of Related Art

Existing night vision systems have many applications in every day life. Perhaps the most well known use for night vision systems is by the military when performing night time maneuvers. The night vision systems permit vision under very low light conditions by converting incoming infrared and/or visible light from a viewed scene to an intensified visible light image. During night time maneuvers, military personnel are often performing other tasks, such as piloting an aircraft or driving a vehicle, which require the freedom of their hands while they are scanning the territory. Accordingly, night vision systems have been developed to be worn upon the head of a user, such as goggles being secured directly on the head or by being mounted to a helmet.

Placing a night vision system on the head of a user places significant constraints upon the optical design of the system. For example, goggles worn upon the head of a user must be both compact and light in weight because excessive weight or front-to-back length of the goggles can cause the goggles to exert large moments on the user's head causing severe instability problems and preventing their effective use in applications in which the user's head may be subjected to high gravitational or centrifugal loads. Furthermore, in a wide field of view optical system, the focal length of the eyepiece optics must be shortened correlatively with that of the wide angle objective for unity magnification; and, in night vision goggles, this results in insufficient eye relief between the eyepiece optics and the eye, which not only causes discomfort to the user, but also interferes with the ability to position a helmet visor, eyeglasses and other structures between the goggles and the eyes of the user. In order to compensate for inadequate eye relief, prior night vision goggles have generally been limited to providing a field of view of no more than about 40 degrees. In such goggles, both eyes see the same field of view, i.e., there is a 100 percent overlap of the image viewed by both eyes of the observer. Such a limited field of view greatly restricts the effectiveness of the night vision apparatus.

U.S. Pat. No. 5,229,598 addresses the above-mentioned problems and discloses a compact, lightweight, night vision system capable of providing an enlarged field of view of up to 60 degrees with improved visual acuity and sufficient eye relief.

In addition to night vision systems, other imaging systems, such as hand-held binoculars, typically provide a rather limited field of view; and it would be desirable to provide such systems with increased fields of view as well.

SUMMARY OF THE INVENTION

The present invention regards a binocular-like vision system for enabling an observer to view an object. The system includes an input end that receives light from the object and an optical transfer system that receives the light received from the input end and transfers the received light to an image intensifier which intensifies the received light, wherein the intensified received light is transferred to and transmitted out of an output end of the system, wherein the light transmitted out of the output end forms a field of view of the object that is greater than a 60 degree horizontal field of view.

Another aspect of the present invention regards a binocular-like vision system for enabling an observer to view an object. The system includes a first optical component having a first input end that receives light from the object and a first output end that receives light from the first input end, wherein the first output end defines a first optical axis along which light received from the first input end is transmitted. A second optical component having a second input end that receives light from the object and a second output end that receives light from the second input end, wherein the second output end defines a second optical axis along which light received from the second input end is transmitted. A third optical component comprising a third input end that receives light from the object and a third output end that receives light from the third input end, wherein the third output end defines a third optical axis along which light received from the third input end is transmitted, wherein light transmitted along the first, second and third optical axes forms a field of view comprising a first portion having a monocular effect on the observer and a second portion having a binocular effect on the observer.

Another aspect of the present invention regards a binocular-like vision system for enabling an observer to view an object. The system includes a first optical component having a first input end that receives light from the object and a first output end that receives light from the first input end, wherein the first output end defines a first optical axis along which light received from the first input end is transmitted. A second optical component having a second input end that receives light from the object and a second output end that receives light from the second input end, wherein the second output end defines a second optical axis along which light received from the second input end is transmitted. A third optical component having a third input end that receives light from the object and a third output end that receives light from the third input end, wherein the third output end defines a third optical axis along which light received from the third input end is transmitted, wherein light transmitted along the first, second and third optical axes is simultaneously transmitted from the binocular-like vision system to the observer.

Each of the above-mentioned inventions present the advantage of providing an enlarged field of view with improved visual acuity and sufficient eye relief for a compact, lightweight, binocular-like vision system.

Further advantages and specific details of the invention will be set forth hereinafter in conjunction with the following detailed description of presently preferred embodiments.

BRIEF DESCRIPTION OF THE DRAWINGS

FIG. 16 shows a top view of a prior art binocular-like vision system and the field of view generated by the system;

FIG. 17 shows a top view of a fifth embodiment of a binocular-like vision system according to the present invention and the filed of view generated by the system;

DESCRIPTION OF THE PREFERRED EMBODIMENT

Several binocular-type viewing systems according to the present invention are schematically shown in FIGS. 1–23, wherein like elements are identified by like numerals. The binocular-like vision systems 50 of FIGS. 1–23 generally have an input end (72, 90) that receives light from an object and an optical transfer system (62, 64, 86, 88) that receives the light received from the input end and transfers the received light to an output end (80, 92) of the system, wherein light transmitted out of the output end forms a field of view of the object that is greater than a 60 degree horizontal field of vision.

Figure 1:
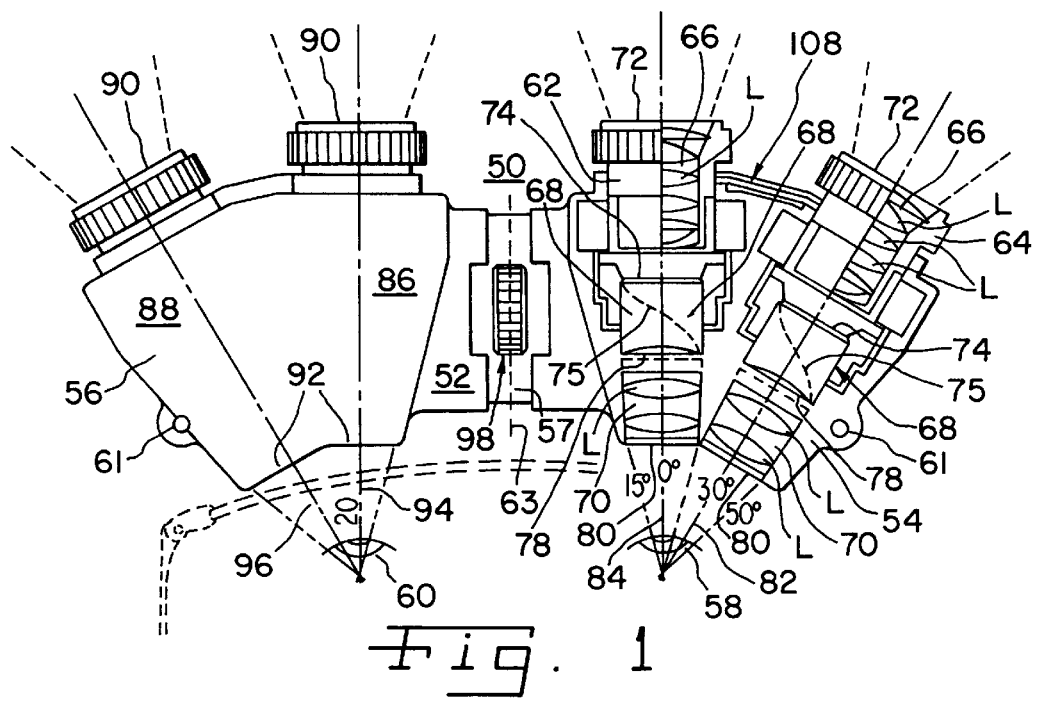
FIG. 1 is a top view of a binocular-like vision system according to the present invention.
Figure 2:
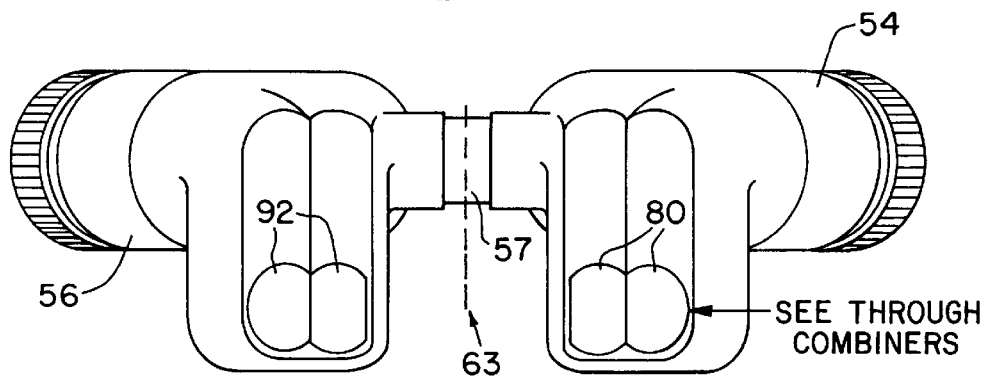
FIG. 2 is a rear view of the binocular-like vision system of FIG. 1.
Figure 3:
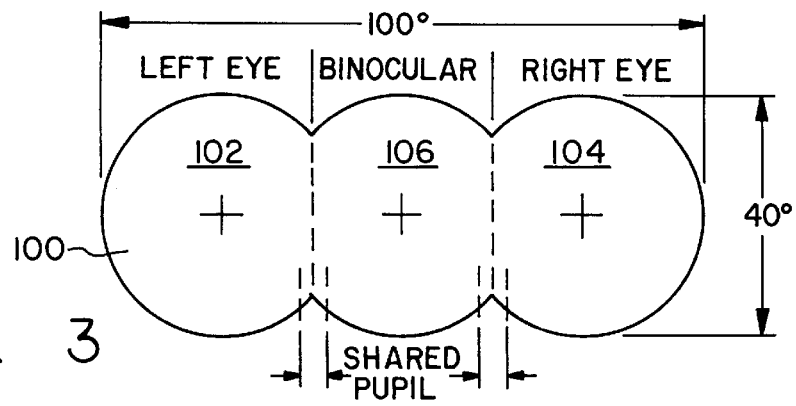
FIG. 3 schematically shows the field of view generated by the binocular-like vision system of FIG. 1.

FIGS. 1–3 show one embodiment of a binocular-like vision system 50 according to the present invention that operates in the above-described manner. The vision system 50 is contained in a housing assembly 52 which has a pair of housings 54 and 56 connected to one another by a bridge 57 and are arranged for respectively covering the right eye 58 and the left eye 60 of an observer. A pair of eyelets 61 are provided in the housings 54 and 56 to receive a strap or the like so that the user can conveniently carry the vision system 50 around his neck when not in use.

Each of housings 54 and 56 contain identical optical systems which are mirror images of each other about a plane 63 (denoted by dashed lines) that bisects the housing assembly 52 as shown in FIG. 1. Accordingly, the discussion to follow regarding the housing 54 is equally applicable to the housing 56.

As shown in FIG. 1, the housing 54 includes two separate optical components 62 and 64. The inner optical component 62 has the identical optical structure as the outer optical component 64. Accordingly, the discussion to follow regarding the structure of the inner optical component 62 is equally applicable to the outer optical component 64. The inner optical component 62 includes three main optical structures—(1) an objective optical system 66, (2) an image intensifier tube 68 and (3) an eyepiece optical system 70. The objective optical system 66 defines an input end 72 that receives light from an object. The objective optical system 66 includes a wide-angle lens group that provide a desired field of view of, for example, 40 degrees and can be of conventional design, such as disclosed in U.S. Pat. No. 5,416,315, the entire contents of which are incorporated herein by reference. The objective optical system 66 includes approximately 2 to 7 optical elements, such as plastic or glass lenses L, which have an effective focal length of approximately 21 mm, P/1.2. The lenses L of the objective optical system are preferably spherical or aspherical in design.

The objective optical system 66 is designed to receive light from an object being viewed at the input end 72 and to transfer an image of the object to the input end or photocathode side 74 of the image intensifier tube 68.

The image intensifier tube 68 makes it possible for the observer to view an object in dark conditions by receiving the visible and/or infrared light image of the object transferred to the input end 74 thereof. The image intensifier tube 68 converts the received image to an intensified visible output image in a predetermined narrow band of wavelengths at the output end 78 of the image intensifier tube 68. The image intensifier tube 68 is well known in the art. For example, the image intensifier tube 68 may include a GaAs photocathode at the input end 74 and the output light from the image intensifier tube 68 is emitted by a green phosphor producing a visible band of light which is known as "P-20" light, although it will be appreciated that other image intensifier constructions could also be used.

The image intensifier tube 68 also includes a fiber optic bundle (schematically shown at 75) for transmitting bits of image data from the photocathode input end 74 to the phosphor output end 78 thereof. The fiber optic bundle 75 is preferably twisted in a manner well known in the art to provide an image rotation of 180 degrees so that an upright image of the object will be presented to the eye of the user.

The intensified visible output image generated by the image intensifier tube 68 is transferred to an output end 80 of the inner optical component 62 via the eyepiece optical system 70. The light transmitted through the output end 80 is transmitted along the optical axis 84 which is aligned with the optical axis of the right eye 58. The eyepiece optical system 70 can be of conventional design, such as disclosed in U.S. Pat. No. 5,416,315, the entire contents of which are incorporated herein by reference. The eyepiece optical system 70 includes approximately 2 to 7 optical elements, such as plastic or glass lenses L, which have an effective focal length of approximately, 21 mm, P/1.2. The lenses L of the objective optical system are preferably spherical or aspherical in design.

In order to enlarge the field of view, an outer optical component 64 is provided which also directs light from the object to the observer. As explained previously, the outer optical component 64 has the same optical structure as the inner optical structure 62 previously described. Like the inner optical component 62, the outer optical component 64 includes an objective optical system 66, an image intensifier tube 68 and an eyepiece optical system 70 which operate in the same manner as their counterparts in the inner optical component 62. Accordingly, the objective optical system 66 and the eyepiece optical system 70 of the outer optical component 64 each have an effective focal length of approximately 21 mm like their counterparts in the inner optical component 62.

The above described outer optical component 64 operates in a manner similar to that of the inner optical component 62. The input end 72 of the outer optical component 64 receives light from an object. The received light is then transferred via the objective optical system 66 to the image intensifier tube 68 which in turn generates an intensified image that is received by the eyepiece optical system 70. The eyepiece optical system 70 then sends the image to an output end 80 of the outer optical component 64. The light transmitted through the output end 80 travels along an optical axis 82 that is offset from the optical axis 84 by an angle ranging from approximately 30° to 35° and which is preferably 30 degrees.

As stated previously, the inner optical component 86 for the left eye 60 has the same structure and operates in the same manner as the inner optical component 62. Similarly, the outer optical component 88 for the left eye 60 has the same structure and operates in the same manner as the outer optical component 64. In other words, the inner and outer optical components 86 and 88 each receive light from an object at the input ends 90 and transfer their images of the object to respective output ends 92. As shown in FIG. 1, the image from the inner optical component 86 is projected along an optical axis 94 that is aligned with the optical axis of the left eye 60 and, thus, substantially parallel to the optical axis 84. The image from the outer optical component 88 is projected along an optical axis 96 that is offset from the optical axis 94 by an angle ranging from 30 degrees to 35 degrees, preferably approximately 30 degrees. As best shown in FIG. 2, the two eyepiece optical systems 70 for each of the housings 54 and 56 are positioned adjacent to each other so that both images at the output ends 80 and 92 appear continuous without a noticeable line of demarcation between the exit elements of the eyepiece optical systems. With respect to the forward looking direction, the two adjacent eyepiece optical systems for each housing 54 and 56 provide a continuous horizontal field of view that begins about 50 degrees to the right (or to the left) and ends 15 degrees to the left (or to the right).

As shown in FIG. 1, the optical systems are in line with the line of sight of the observers eyes 58 and 60. In addition, as shown in FIG. 2, the output ends 80 and 92 may each be offset below their respective input ends 72 and 90. This is accomplished by inserting well known mirror systems or prism systems (not shown) between the output ends 78 of the image intensifier tubes 68 and the eyepiece optical components 70. The apparatus also includes a well known mechanism 98 for adjusting the interpupillary distance between the eyepiece optical systems in the two housings 54 and 56 to accommodate different users.

The field of view 100 generated by the light simultaneously transmitted along the four optical axes 82, 84, 94, 96 to the observer is schematically shown in FIG. 3. The field of view 100 is the result of having the sub-fields of view formed from each of the output ends 80 and 92 overlap one another. Each of the four sub-fields of view are circular having a horizontal field of view of approximately 40 degrees and a vertical field of view of approximately 40 degrees. The field of view 100 includes two peripheral portions 102 and 104 that are separated from one another and each portion 102 and 104 has a monocular effect on the observer. The field of view 100 includes an overlapping central portion 106 spanning approximately 30 degrees. The central portion 106 is positioned between the monocular portions 102 and 104 and is viewed by both eyes 58 and 60 of the observer so as to provide full depth perception and exact stereo vision in the central portion. The field of view 100 has a vertical field of view of approximately 40 degrees and a horizontal field of view of approximately 100 degrees. Thus, the optical transfer system of the invention forms a first sub-field of view and a second sub-field of view, wherein the first and second sub-field of view form said field of view. The second sub-field of view overlaps the first sub-field of view. In one preferred embodiment, the first sub-field of view comprises a horizontal field of approximately 40 degrees.

The above described binocular-like vision system 50 of FIGS. 1–3 has a mass of approximately 550 g, a microchannel plate (MCP) pitch of ranging from 6 to 7 microns, a limiting resolution of greater than or equal to 60 LP/mm, eye relief of greater than or equal to 20 mm and system resolution of approximately 1.15 cy/mr min. Note that in order to produce a distortion-free system 50, the magnifications of all four optical components 62, 64, 86 and 88 must be controlled to be within 2.5% of each other. In addition, a coupled focus mechanism 108 is provided to adjust the position of the input ends in the X and Y directions so that any mismatch between two adjacent images at the output ends is eliminated.

Other variations of the binocular-like vision system 50 are possible by varying the objective and eyepiece optical systems 66 and 70 in numerous ways in a manner well known in the art. For example, a horizontal field of view of approximately 120 degrees and a vertical field of view of approximately 50 degrees is formed by the binocular-like vision system 50 of FIGS. 4–6. The binocular-like vision system 50 of FIGS. 4–6 basically has the same structure as and functions like the system 50 previously described with respect to FIGS. 1–3 with some minor changes to the objective optical components 66 and the eyepiece optical components 70 of the optical components 62, 64, 86 and 88. The image intensifier tubes 68 are unchanged.

As with the vision system 50 of FIGS. 1–3, the inner optical components 62, 86 and the outer optical components 64 and 88 each have identical optical structures. The objective optical system 66 and eyepiece optical system 70 can be of conventional design, such as disclosed in U.S. Pat. No. 5,416,315, the entire contents of which are incorporated herein by reference. The objective optical system 66 includes approximately 2 to 7 optical elements, such as plastic or glass lenses L, which have an effective focal length of approximately 17 mm. The eyepiece optical system 70 includes approximately 2 to 7 optical elements, such as plastic or glass lenses L, which have an effective focal length of approximately 22 mm. The lenses L of both the objective optical systems 66 and the eyepiece optical systems 70 are preferably spherical or aspherical in design.

Figure 4:
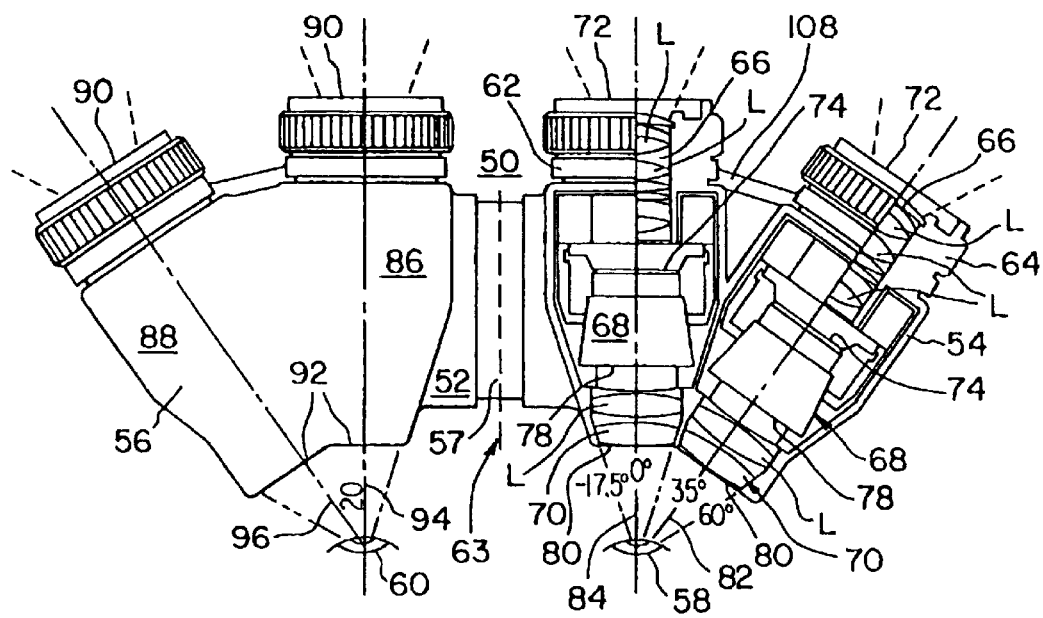
FIG. 4 is a top view of a second embodiment of a binocular-like vision system according to the present invention.

As shown in FIG. 4, the optical axes 84 and 94 are aligned with the optical axes of the right and left eyes 58 and 60, respectively, of the observer. The optical axes 82 and 96 are offset from the optical axes 84 and 94, respectively, by approximately 35 degrees.

Figure 6:
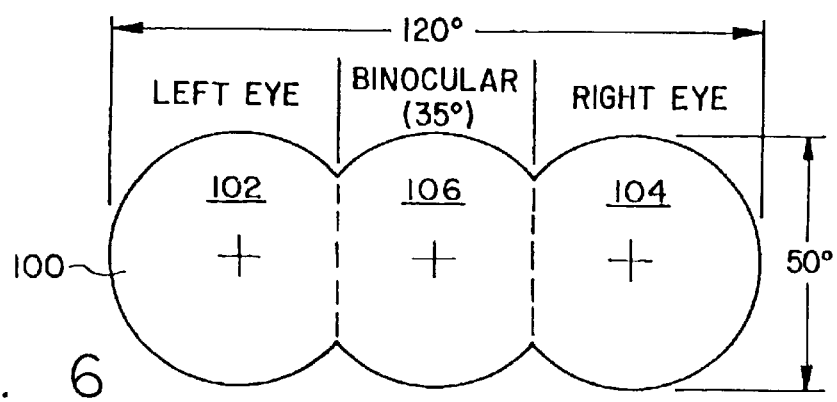
FIG. 6 schematically shows the field of view generated by the binocular-like vision system of FIG. 4.

The field of view 100 generated by the light simultaneously transmitted along the four optical axes 82, 84, 94 and 96 is schematically shown in FIG. 6. The field of view 100 is the result of having the sub-fields of view formed from the output ends 80 and 92 overlapping one another. The four sub-fields of view each are circular having a horizontal field of view of approximately 50 degrees and a vertical field of view of approximately 50 degrees. In a manner similar to that shown in FIG. 3, the field of view 100 includes two monocular portions 102, 104 and a 35 degree binocular portion 106. The field of view 100 has a vertical field of view of approximately 50 degrees and a horizontal field of view of approximately 120 degrees.

Figure 5:
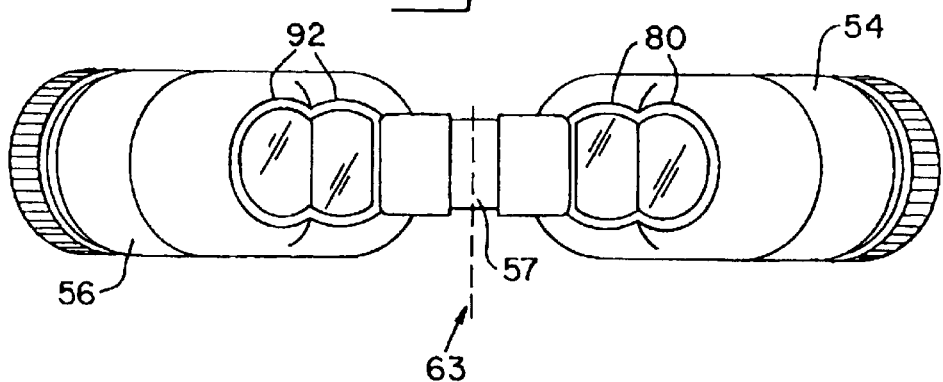
FIG. 5 is a rear view of the binocular-like vision system of FIG. 4.

The above described binocular-like vision system 50 of FIGS. 4–6 has a mass of approximately 550 g, a limiting resolution ranging from 57 to 60 LP/mm and a system resolution of approximately 0.93 cy/mr min.

Figure 7:
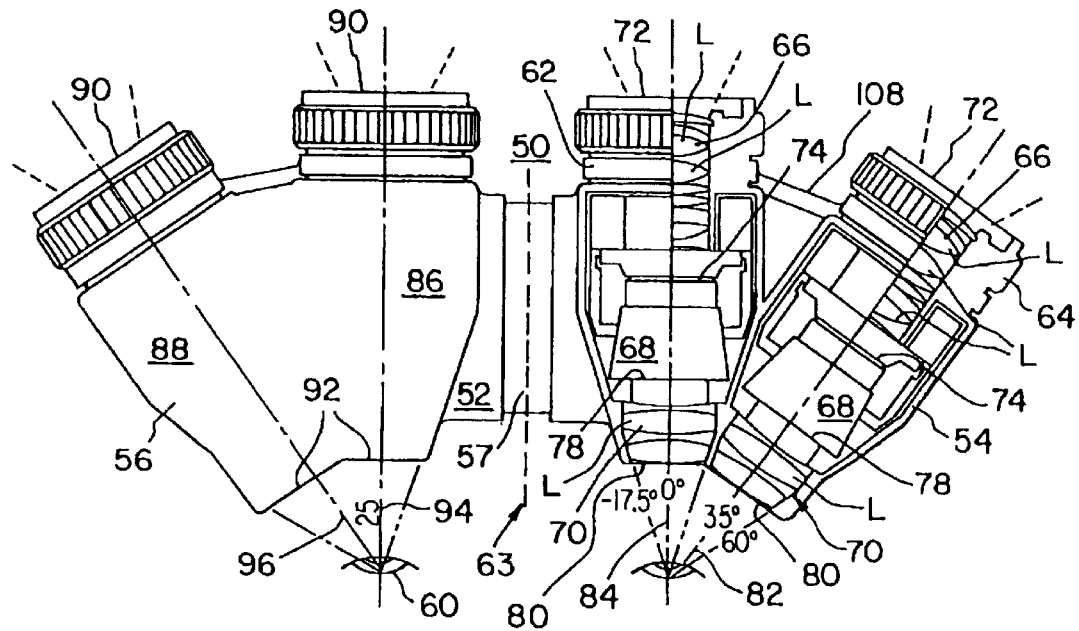
FIG. 7 is a top view of a third embodiment of a binocular-like vision system according to the present invention.
Figure 8:
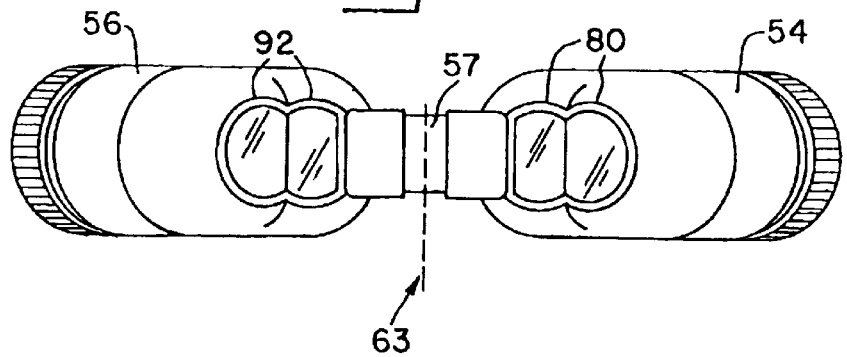
FIG. 8 is a rear view of the binocular-like vision system of FIG. 7.
Figure 9:
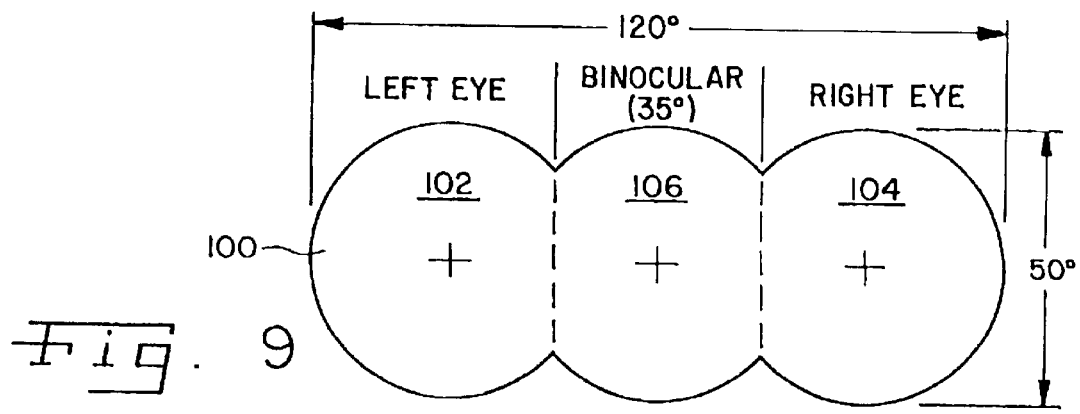
FIG. 9 schematically shows the field of view generated by the binocular-like vision system of FIG. 7.
Figure 10:
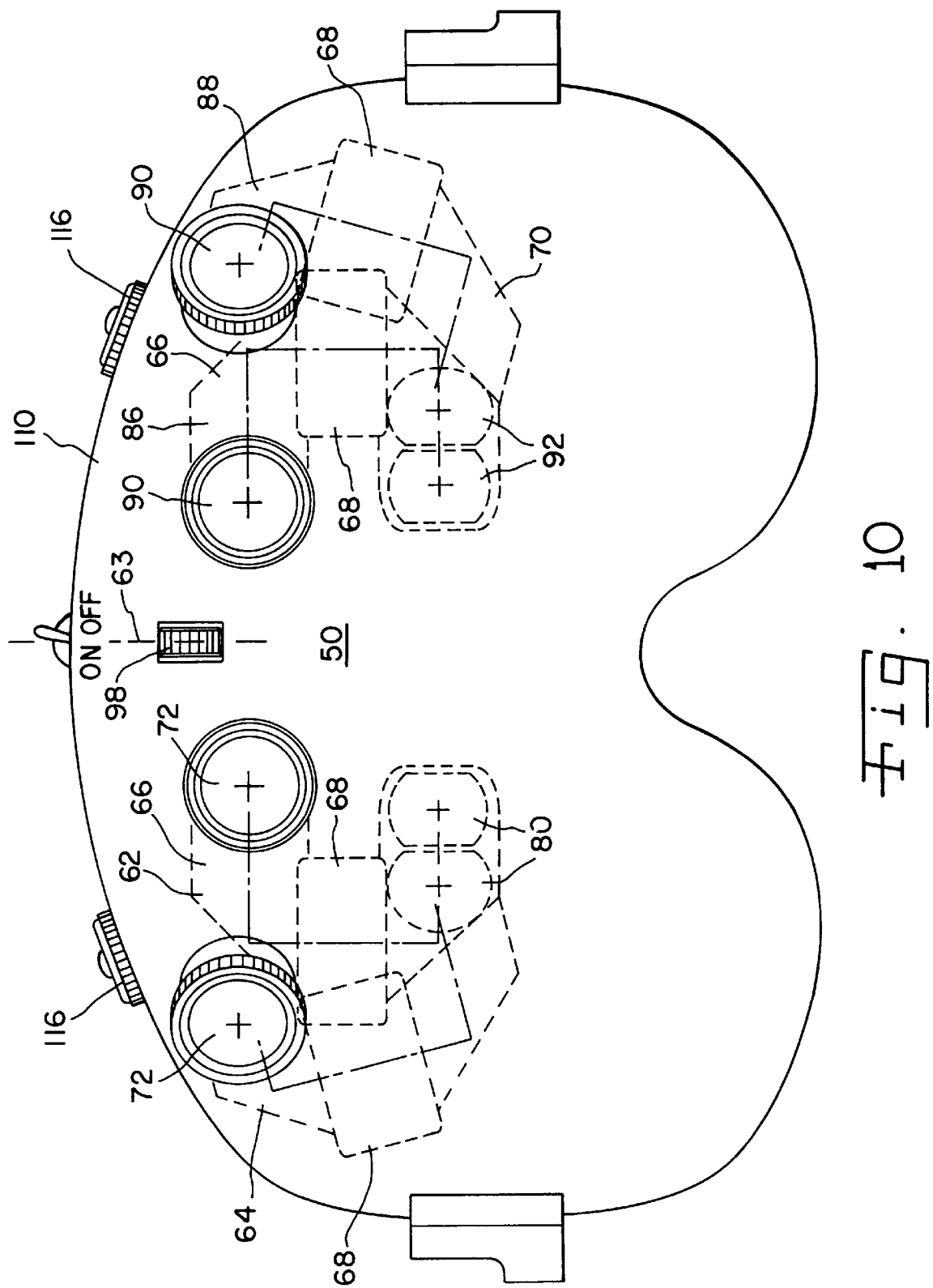
FIG. 10 is a front view of a fourth embodiment of a binocular-like vision system according to the present invention.

The binocular-like vision system 50 of FIGS. 7–9 basically has the same structure as and functions like the vision system 50 previously described with respect to FIGS. 4–6 where the objective optical components 66 of the inner and outer optical components 62, 64, 86 and 88 are each replaced with an identical 26 to 27 mm effective focal length objective optical component 66 sold by Night Vision Corporation under the NOVA-8 trademark. The image intensifier tubes 68 are also sold by Night Vision Corporation under the NOVA-8 trademark.

As with the vision system 50 of FIGS. 1–6, the inner optical components 62, 86 and the outer optical components 64 and 88 each have identical optical structures for the objective optical systems 66, the image intensifier tubes 68 and the eyepiece optical systems 70. The eyepiece optical system 70 can be of conventional design, such as disclosed in U.S. Pat. No. 5,416,315, the entire contents of which are incorporated herein by reference. The eyepiece optical system 70 includes approximately 2 to 7 optical elements, such as plastic or glass lenses L, which have an effective focal length of approximately 26 to 27 mm. The lenses L of both the objective optical system 66 and the eyepiece optical system 70 are preferably spherical or aspherical in design.

As shown in FIG. 7, the optical axes 84 and 94 are aligned with the optical axes of the right and left eyes 58 and 60, respectively, of the observer. The optical axes 82 and 96 are offset from the optical axes 84 and 94, respectively, by approximately 35 degrees.

The field of view 100 generated by the light simultaneously transmitted along the four optical axes 82, 84, 94 and 96 is schematically shown in FIG. 9. The field of view 100 is the result of having the sub-fields of view formed from the output ends 80 and 92 overlapping one another. The four sub-fields of view each are circular having a horizontal field of view of approximately 50 degrees and a vertical field of view of approximately 50 degrees. In a manner similar to that shown in FIG. 3, the field of view 100 includes two monocular portions 102, 104 and a 35 degree binocular portion 106. The field of view 100 has a vertical field of view of approximately 50 degrees and a horizontal field of view of approximately 120 degrees.

The above described binocular-like vision system 50 of FIGS. 7–9 has a mass of approximately 950 g, a limiting resolution of greater than 60 LP/mm, a MCP pitch of 6–7 microns and a system resolution ranging from 1.1 to 1.4 cy/mr min.

Figure 12:
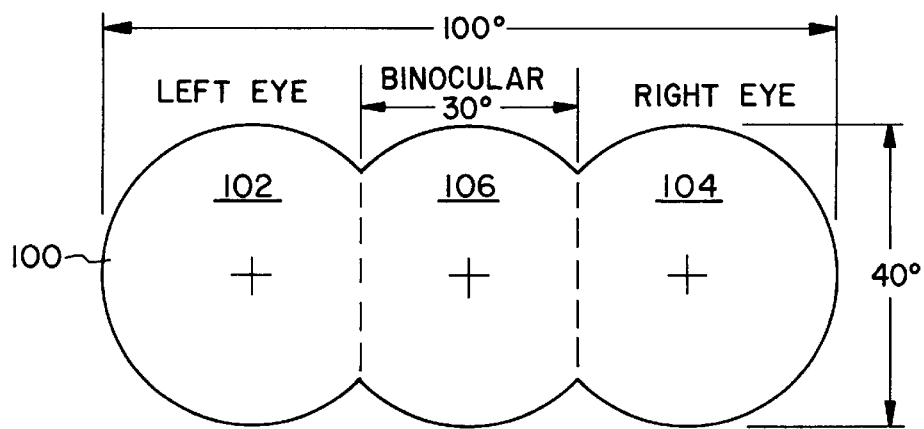
FIG. 12 schematically shows the field of view generated by the binocular-like vision system of FIG. 10.
Figure 13:
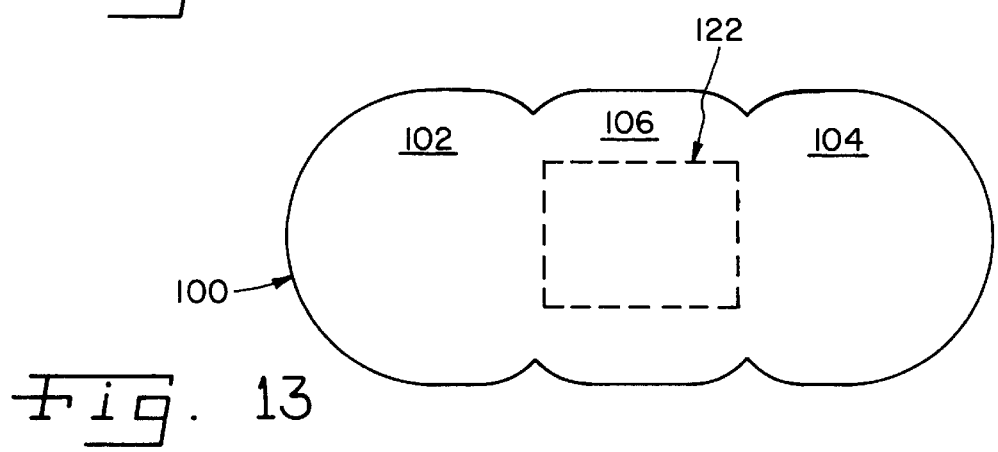
FIG. 13 schematically illustrates a head up display (HUD) superimposed on the field of view of FIG. 12.
Figure 14:
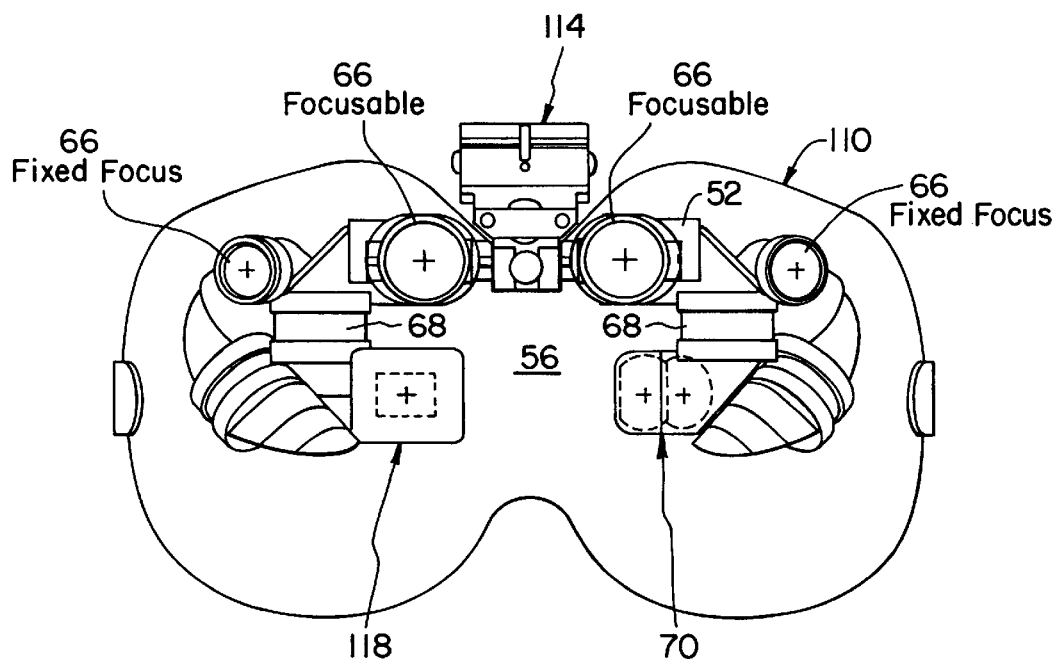
FIG. 14 is a front view of the binocular-like vision system of FIG. 10 with a mounting structure for attachment to a helmet.
Figure 15:
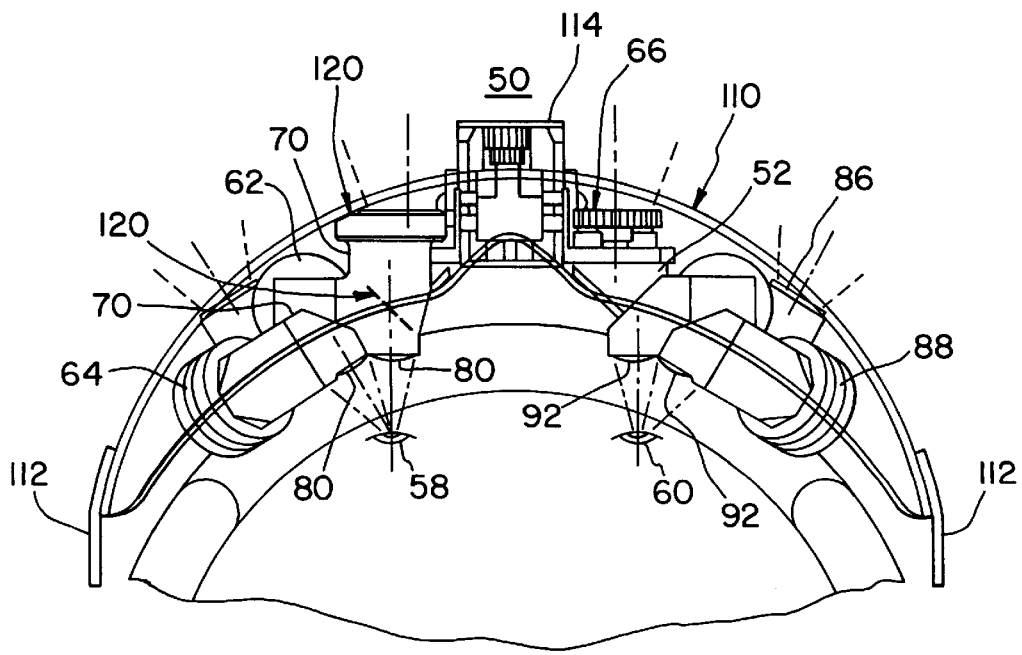
FIG. 15 is a bottom view of the binocular-like vision system of FIG. 14.
Figure 18:
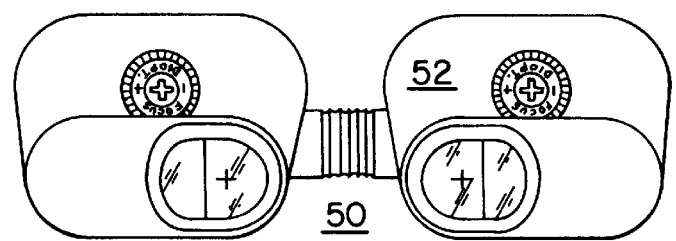
FIG. 18 is a front view of a sixth embodiment of a binocular-like vision system according to the present invention.
Figure 19:
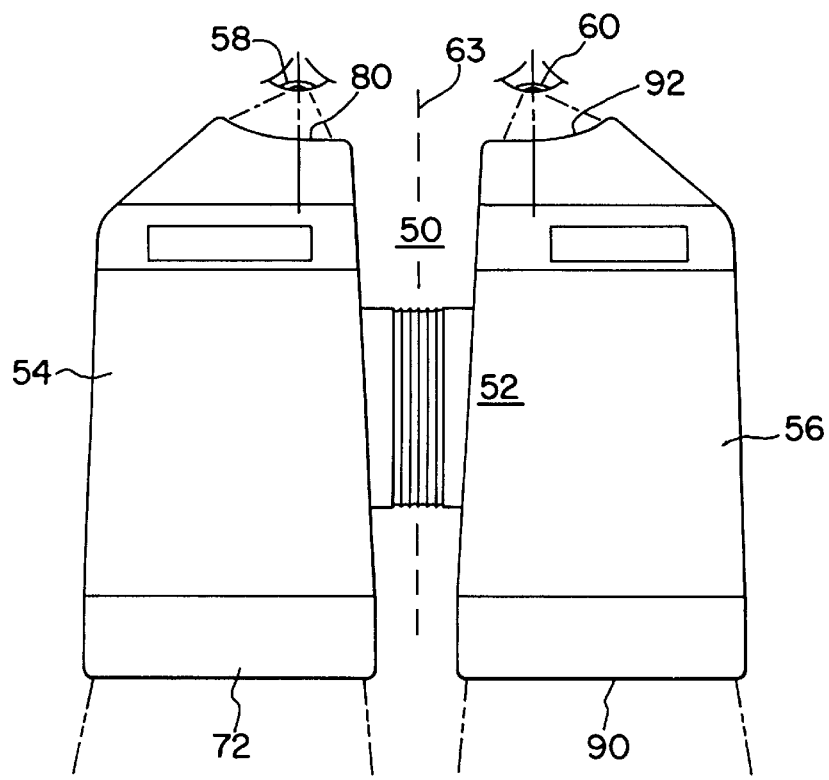
FIG. 19 is a top view of the binocular-like vision system of FIG. 18.
Figure 20:
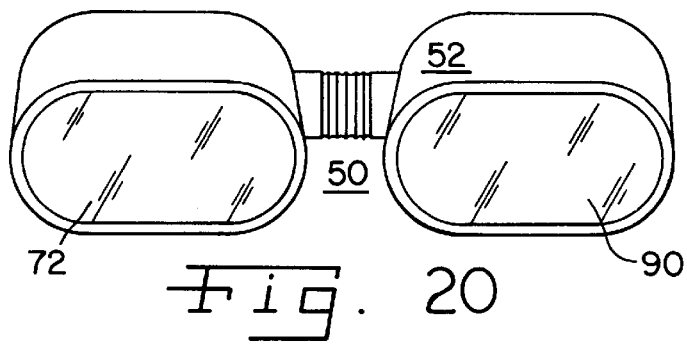
FIG. 20 is a rear view of the binocular-like vision system of FIG. 18.

A fourth embodiment of a binocular-like vision system according to the present invention is shown in FIGS. 10–15. More particularly, FIGS. 10–15 illustrate a vision visor system in which a binocular-like vision system 50 is mounted to a helmet-mounted visor 110 for use by aircraft pilots and the like. As shown in FIGS. 14 and 15, the visor 110 is mounted to the helmet 112 by an Aviator Night Vision Imaging System (ANVIS)-type mount 114. The mount 114 allows the visor 110 to move between a down position in front of the eyes of the observer during use and an up position away from the observer's face when not in use. The vision system 50 typically includes input ports to project Head-up display (HUD) information and for other purposes, suitable power source couplings and other structures which do not form a part of the present invention and are thus not described herein.

The binocular-like vision system 50 of FIGS. 10–15 generally has the same structure as and functions like the vision system 50 previously described with respect to the systems 50 of FIGS. 1–9 where the objective and eyepiece optical components 66 and 70 of the inner and outer optical components 62, 64, 86 and 88 are each replaced with optical components to give a desired field of view. As with the vision system 50 of FIGS. 1–9, the inner optical components 62, 86 and the outer optical components 64 and 88 each have identical optical structures for the objective optical systems 66, the image intensifier tubes 68 and the eyepiece optical systems 70. The objective and eyepiece optical systems 66 and 70 can be of conventional design, such as disclosed in U.S. Pat. No. 5,416,315, the entire contents of which are incorporated herein by reference. The objective optical system 66 includes approximately optical elements, such as plastic or glass lenses L, which have an effective focal length of approximately 21.9 mm. The eyepiece optical system 70 includes approximately optical elements, such as plastic or glass lenses L, which have an effective focal length of approximately 21.9 mm. The lenses L of both the objective optical system 66 and the eyepiece optical system 70 are preferably spherical or aspherical in design.

As shown in FIGS. 10–11 and 14–15, all four light components 62, 64, 86 and 88 have light paths which are folded in contrast to the linear like light paths of the binocular-like vision systems 50 of FIGS. 1–9. The folded light paths are formed by a number of well known fold prisms along the optical paths and between the image intensifier tubes 68 and the eyepiece optical systems 70 in a manner as described in U.S. Pat. No. 5,416,315, the entire contents of which are incorporated herein by reference. The folded optical paths allow the apparatus to be packaged radially close to the face along the contour of the visor 110, thereby minimizing any resulting shift in the center of gravity of total head-borne weight. The apparatus also provides a low profile that minimizes any adverse aerodynamic effects that might develop under wind blast conditioning.

Figure 11:
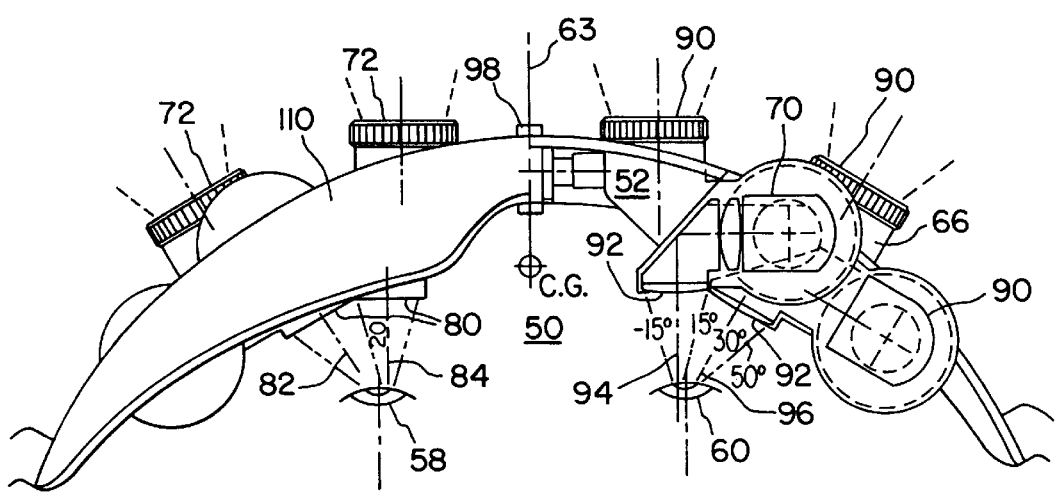
FIG. 11 is a bottom view of the binocular-like vision system of FIG. 10.

As shown in FIG. 11, the optical axes 84 and 94 are aligned with the optical axes of the right and left eyes 58 and 60, respectively, of the observer. The optical axes 82 and 96 are offset from the optical axes 84 and 94, respectively, by approximately 35 degrees.

The field of view 100 generated by the light simultaneously transmitted along the four optical axes 82, 84, 94 and 96 is schematically shown in FIG. 12. The field of view 100 is the result of having the sub-fields of view formed from the output ends 80 and 92 overlapping one another. The four sub-fields of view each are circular having a horizontal field of view of approximately 40 degrees and a vertical field of view of approximately 40 degrees. In a manner similar to that shown in FIG. 3, the field of view 100 includes two monocular portions 102, 104 and a 35 degree binocular portion 106. The field of view 100 has a vertical field of view of approximately 40 degrees and a horizontal field of view of approximately 100 degrees.

The above described binocular-like vision system 50 of FIGS. 10–15 has a mass of approximately 550 g, a limiting resolution of approximately 60 LP/mm, an eye relief of 20 mm min, a system gain of 3,000 min. and a system resolution of approximately 1.10 cy/mr min.

Note that each of the objective optical systems 62, 64, 86, 88 is mounted in and extends slightly through an opening provided in the visor 110 and is mounted to the visor 110 by suitable bearings or the like. Although the objective optical systems 66 are fixed in position in the visor 110, the eyepiece optical systems 70 are adjustable by adjustment knobs 116 (FIG. 10) to match the interpupillary distances of the users. The housings carrying the objective optical systems 66 are rotatable in their respective bearings to permit the eyepiece optical systems 70 to be adjusted in position. Various structural details and advantageous features of the visor-mounted panoramic night vision apparatus 50 of FIGS. 10–15 are described in detail in U.S. Pat. No. 5,416,315, the disclosure of such patent is hereby incorporated herein by reference.

The binocular-like vision system 50 of FIGS. 10–15 may also include a head up display (HUD) unit 118 for the display of secondary information such as aircraft data and symbology to the pilot and crew. A combiner element 120 is used to superimpose HUD information onto the image-intensified scene of the right eye 58 so that they appear in the same plane. Thus, no change of the eye's distance adaptation is needed. The HUD information defines a rectangular region 122 of approximately 28 degrees wide by 20 degrees high in the field of view 100 centered on the user's forward-looking line of sight as shown in FIG. 13.

The HUD information is preferably provided in a contrasting color (e.g., yellow) to the green image intensified scene, and because the HUD and the image intensifier tube provide information in different colors, a dichroic combiner is used. As a result, the system will provide high brightness for both images without requiring excessive luminance from either of the two sources.

The head-up display 118 in FIGS. 10–11 and 14–15 is preferably an electroluminescent display although it may also comprise a liquid crystal display (LCD). In this regard, reference is made to U.S. Pat. No. 5,254,852, the entire contents of which are incorporated herein by reference, which describes the use of a liquid crystal display device for presenting a secondary image to a user in a night imaging system.

In general, the information presented on the electronic display is selected and formatted in a computer and is presented to the display subsystem as a nominal RS-170 or the like monochrome, on-off (no gray scale or with gray scale type) signal. The display panel is capable of producing a minimum of 480-row by 640-column to 1024×1080 (SVGA) pixel images. Since the combiner 120 is used, the HUD image is projected continuously and the user perceives yellow symbols overlaying the intensified image.

Incorporation of the HUD unit 118 into the panoramic night vision imaging apparatus 50 adds very little weight to the overall apparatus (e.g., about 65 grams); and, accordingly, the overall apparatus remains ejection safe with a minimal shift in the center of gravity of the total headborne weight.

In the embodiments described with reference to FIGS. 1–15, panoramic night vision imaging apparatus are described. As shown in FIGS. 17–23, the present invention may also be utilized in imaging apparatus which do not include an image intensifier tube 68. The binocular-like vision systems 50 of FIGS. 17–23 generally have the same structure as and functions like the system 50 previously described with respect to the systems 50 of FIGS. 1–15. One difference between the vision system 50 of FIGS. 1–15 and FIGS. 17–23 is that the light from the objective optical systems 66 will be transferred directly to the eyepiece optical systems 70 without being intensified by an image intensifier tube 68. Like the vision systems 50 of FIGS. 1–15, the vision systems of FIGS. 17–23 are able to produce an enlarged field of view by using two optical components per eye. The vision systems 50 of FIGS. 17–23 will produce a field of view that is larger than the 43 degree field of vision produced by the prior art binoculars of FIG. 16. The binoculars of FIG. 16 are a set of Jason 7×35 PermaFocus binoculars which produce a horizontal field of view of 113 yards at a distance of 1000 yards.

The binocular-like vision systems 50 of FIGS. 17–23 include inner optical components 62, 86 and outer optical components 64 and 88, each component having identical optical structures for the objective optical systems 66 and the eyepiece optical systems 70. The objective and eyepiece optical systems 66 and 70 can be of conventional design, such as disclosed in U.S. Pat. No. 5,416,315, the entire contents of which are incorporated herein by reference. The objective optical system 66 includes approximately 2 to 7 optical elements, such as plastic or glass lenses L, which have an effective focal length of approximately 160 mm. The eyepiece optical system 70 includes approximately 2 to 7 optical elements, such as plastic or glass lenses L, which have an effective focal length of approximately 25 mm. The lenses L of both the objective optical system 66 and the eyepiece optical system 70 are preferably spherical or aspherical in design.

Figure 21:
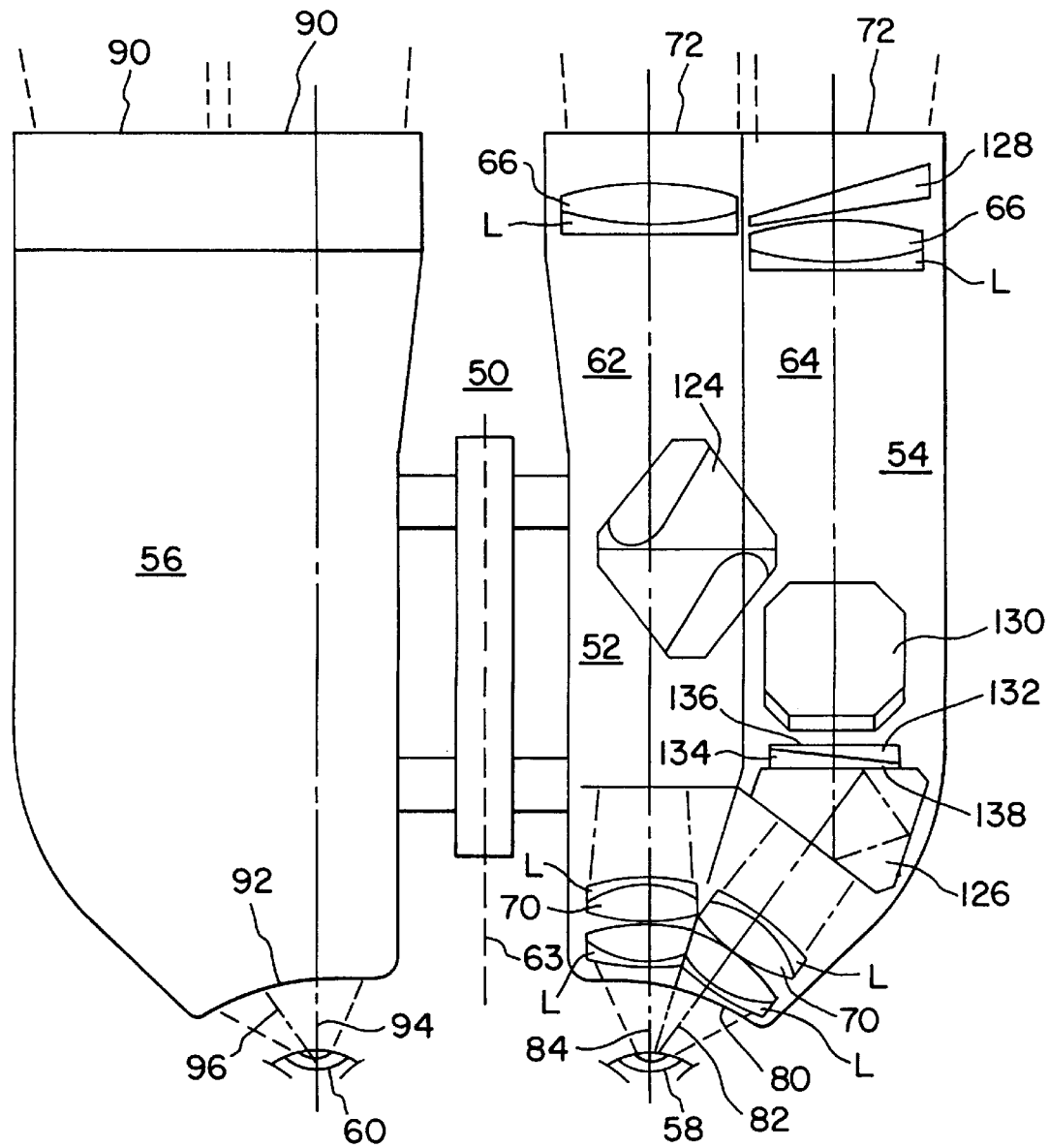
FIG. 21 is a partially exposed top view of the binocular-like vision system of FIG. 18.
Figure 22:
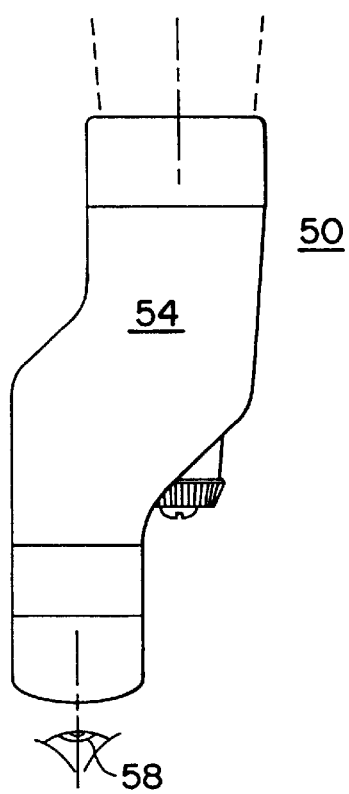
FIG. 22 shows a side view of the binocular-like vision system of FIG. 18.
Figure 23:
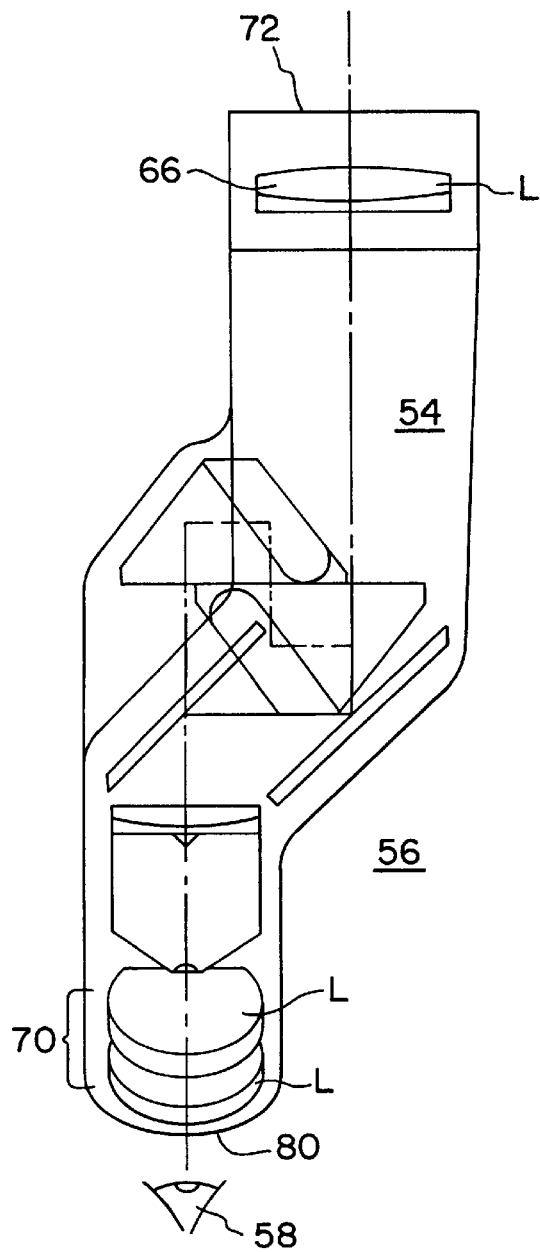
FIG. 23 shows an exposed side view of the binocular-like vision system of FIG. 22.

As shown in FIGS. 17 and 21, the light from the four objective optical systems 66 is transmitted to intermediate optical components 124 and 126 before entering the eyepiece optical systems 70. Optical component 124 preferably is a Porro prism which rotates the image from the inner optical components 62 and 86 by 180 degrees so as to present an upright image to the observer. Optical component 126 preferably is a Schmidt prism which rotates and bends the image from the outer optical components 64 and 88 so as to present an upright image.

As shown in FIGS. 17 and 21, the optical axes 84 and 94 are aligned with the optical axes of the right and left eyes 58 and 60, respectively, of the observer. The optical axes 82 and 96 are offset from the optical axes 84 and 94, respectively, by approximately 35 degrees.

The field of view 100 generated by the light transmitted along the four optical axes 82, 84, 94 and 96 shown in FIGS. 17 and 21 is similar to that shown in FIG. 6. The field of view 100 is the result of having the sub-fields of view formed from the output ends 80 and 92 overlapping one another. The four sub-fields of view each are circular having a horizontal field of view of approximately 50 degrees and a vertical field of view of approximately 50 degrees. The field of view 100 includes two monocular portions 102, 104 and a 35 degree binocular portion 106. The field of view 100 has a vertical field of view of approximately 50 degrees and a horizontal field of view of approximately 120 degrees. The binocular-like vision system 50 of FIG. 17, for example, theoretically produces a horizontal field of view of 495 yards at a distance of 1000 yards. The vision system 50 of FIGS. 18–23 produces a horizontal field of view of 1058 feet at 1000 yards.

As in previous embodiments of FIGS. 1–15, the eyepiece optical systems 70 in each housing 54 and 56 are positioned adjacent to each other so that the overall panoramic image appears continuous without a noticeable line of demarcation between the exit elements of the eyepiece.

The vision system 50 of FIGS. 18–23 differs from the vision system 50 of FIG. 17 in several ways. First, the outer components 64 and 88 of the vision system 50 of FIGS. 18–23 each include a wedge-shaped lens 128 inserted at the input end 72. The lens 128 deflects the line of vision entering the outer components 64 and 88 in a well known manner. The outer components 64 and 88 further include a mirror 130 that directs light from the objective optical system 66 to a pair of wedged-shaped lenses 132 and 134 that are located adjacent to the prism 126. As shown in FIG. 21, the lenses 132 and 134 are arranged on each other to form parallel input and output sides 136 and 138, respectively. The lenses 132 and 134 correct the color generated by the lens 128.

The foregoing description is provided to illustrate the invention, and is not to be construed as a limitation. Numerous additions, substitutions and other changes can be made to the invention without departing from its scope as set forth in the appended claims. For example, although visor-mounted night vision imaging apparatus are described herein, the apparatus could readily be designed for mounting directly to a helmet, if desired. In addition, the optics of components 62, 64, 86 and 88 of FIGS. 1–23 may differ from each other as long as their components 66, 68 and 70 are able to achieve the desired parameters of the vision system, such as the desired magnification and effective focal lengths of the components of the system. Accordingly, it should be understood that the invention is to be limited only insofar as is required by the scope of the following claims.

What is claimed is:

1. A binocular-like vision system for enabling an observer to view an object during low light conditions, said system comprising:

at least three optical channels including a first optical channel comprising a first input end that receives light from said object and a first output end that receives light from said first input end, wherein said first output end defines a first optical axis along which light received from said first input end is transmitted;

a second optical channel comprising a second input end that receives light from said object and a second output end that receives light from said second input end, wherein said second output end defines a second optical axis along which light received from said second input end is transmitted; and a third optical channel comprising a third input end that receives light from said object and a third output end that receives light from said third input end, wherein said third output end defines a third optical axis along which light received from said third input end is transmitted, wherein light transmitted along said first, second and third optical axes is simultaneously transmitted from said binocular like vision system to said observer, and wherein light tranmitted from said at least three optical channels forms a field of view comprising a horizontal field of view of approximately 100 degrees.

2. The binocular-like vision system of claim 1, wherein said first optical channel comprises an image intensifier which is positioned between said first input end and said first output end and intensifies said received light from said first input end, wherein said intensified received light is transferred to said first output end.

3. The binocular-like vision system of claim 1, wherein light transmitted from said at least three optical channels forms a field of view comprising a vertical field of vision of approximately 40 degrees.

4. The binocular-like vision system of claim 1, wherein light transmitted from said at least three optical channels forms a field of view comprising a first portion having a monocular effect and a second portion having a binocular effect.

5. The binocular-like vision system of claim 4, wherein said field of view comprises a third portion having a monocular effect.

6. The binocular-like vision system of claim 5, wherein said first and third portions are separated from one another.

7. The binocular-like vision system of claim 6, wherein said second portion is positioned between said first and third portions.

8. The binocular-like vision system of claim 1, comprising a fourth optical channel comprising a fourth input end that receives light from said object and a fourth output end that receives light from said fourth input end, wherein said fourth output end defines a fourth optical axis along which light received from said fourth input end is transmitted, wherein light transmitted from said four optical channels is simultaneously transmitted from said binocular-like vision system to said observer.

9. The binocular-like vision system of claim 8, wherein said first optical channel comprises an image intensifier positioned between said first input end and said first output end and intensifies said received light from said first input end, wherein said intensified received light is transferred to said first output end.

10. The binocular-like vision system of claim 8, wherein light transmitted from said first, second, third and fourth optical channels forms a field of view comprising a horizontal field of view of approximately 100 degrees.

11. The binocular-like vision system of claim 8, wherein light transmitted from said first, second, third and fourth optical channels forms a field of view comprising a first portion having a monocular effect and a second portion having a binocular effect.

12. The binocular-like vision system of claim 11, wherein said field of view comprises a third portion having a monocular effect.

13. The binocular-like vision system of claim 12, wherein said first and third portions are separated from one another.

14. The binocular-like vision system of claim 13, wherein said second portion is positioned between said first and third portions.

15. The binocular-like vision system of claim 8, wherein said third optical axis is angularly spaced from said fourth optical axis ranges from approximately 30° to approximately 35°.

16. The binocular-like vision system of claim 1, wherein said first optical axis is substantially parallel to said third axis.

17. A panoramic imaging apparatus for low light conditions comprising:

a first pair of imaging systems for presenting a first pair of images of a viewed scene to a first, left eye of a user, and a second pair of imaging systems for presenting a second pair of images of the viewed scene to a second, right eye of the user;

said first pair of imaging systems including a first imaging system which is directed to look substantially straight ahead and second imaging system which is directed to look at an angle of approximately 30 to 35 degrees to the left with respect to the first imaging system of the first pair of imaging systems, and said second pair of imaging systems including a first imaging system which is directed to look substantially straight ahead and a second imaging system which is directed to look at an angle of approximately 30 to 35 degrees to the right which respect to the first imaging system of the second pair of imaging systems, wherein said first imaging systems of both said first and second pairs of imaging systems are directed to look substantially straight ahead in a parallel fashion.

18. The panoramic imaging apparatus of claim 17 wherein said first and second imaging systems of said first and second pairs of imaging systems each comprise optical imaging systems, and wherein each first and second optical imaging system includes an objective optical system for receiving incoming light from the viewed scene, and an eyepiece optical system for presenting an image of the viewed scene to an eye of the user.

19. The panoramic imaging apparatus of claim 18 wherein the eyepiece optical system of the first and second imaging system of each pair of imaging systems are positioned adjacent each other so that the images from each appear continuous without any noticeable line of demarcation between viewed images.

20. The panoramic imaging apparatus of claim 19 wherein the combined effect of the imaging systems provides a continuous field of view which includes left and right peripheral portions presented to the left and right eyes, respectively, of the user, and a central portion presented to both eyes of the user so as to provide full depth perception and stereo vision in the central portion.

21. The panoramic imaging apparatus of claim 20 wherein said continuous field of view is at least about 100 degrees in the horizontal direction and said central portion of said field of view is at least about 30 degrees in the horizontal direction.

22. The panoramic imaging apparatus of claim 19 wherein each of said first and second imaging systems of said first and second pairs of imaging systems further includes an image intensifier tube between the objective optical systems and the eyepiece optical systems thereof for converting incoming infrared and/or visible light to an intensified visible image for presentation to the eyes of the user.

23. The panoramic imaging apparatus of claim 22 wherein said apparatus is mounted to and movable with a helmet-mounted visor.

24. The panoramic imaging apparatus of claim 22 wherein said apparatus further includes a head-up display unit for displaying aircraft data and symbology information, and a combiner apparatus for superimposing the information onto the intensified image presented to an eye of the user.

25. The panoramic imaging apparatus of claim 17 wherein said apparatus comprises binoculars.

26. A binocular-like vision system for enabling an observer to view an object, said system comprising:
a first optical channel comprising a first input end that receives light from said object and a first output end that receives light from said first input end, wherein said first output end defines a first optical axis along which light received from said first input end is transmitted;
a second optical channel comprising a second input end that receives light from said object and a second output end that receives light from said second input end, wherein said second output end defines a second optical axis along which light received from said second input end is transmitted;
a third optical channel comprising a third input end that receives light from said object and a third output end that receives light from said third input end, wherein said third output end defines a third optical axis along which light received from said third input end is transmitted; and
a fourth optical channel comprising a fourth input end that receives light from said object and a fourth output end that receives light from said fourth input end, wherein said fourth output end defines a fourth optical axis along which light received from said fourth input end is transmitted, wherein light transmitted along said first, second, third and fourth optical axes is simultaneously transmitted from said binocular-like vision system to said observer and forms a field of view comprising a vertical field of view of approximately 40 degrees.

27. A binocular-like vision system for enabling an observer to view an object, said system comprising:
a first optical channel comprising a first input end that receives light from said object and a first output end that receives light from said first input end, wherein said first output end defines a first optical axis along which light received from said first input end is transmitted;
a second optical channel comprising a second input end that receives light from said object and a second output end that receives light from said second input end, wherein said second output end defines a second optical axis along which light received from said second input end is transmitted,
a third optical channel comprising a third input end that receives light from said object and a third output end that receives light from said third input end, wherein said third output end defines a third optical axis along which light received from said third input end is transmitted; and
a fourth optical channel comprising a fourth input end that receives light from said object and a fourth output end that receives light from said fourth input end, wherein said fourth output end defines a fourth optical axis along which light received from said fourth input end is transmitted, wherein light transmitted along said first, second, third and fourth optical axes is simultaneously transmitted from said binocular-like vision system to said observer and forms a field of view comprising a horizontal field of view of approximately 100 degrees.

28. A binocular-like vision system for enabling an observer to view an object, said system comprising:
a first optical channel comprising a first input end that receives light from said object and a first output end that receives light from said first input end, wherein said first output end defines a first optical axis along which light received from said first input end is transmitted;
a second optical channel comprising a second input end that receives light from said object and a second output end that receives light from said second input end, wherein said second output end defines a second optical axis along which light received from said second input end is transmitted;
a third optical channel comprising a third input end that receives light from said object and a third output end that receives light from said third input end, wherein said third output end defines a third optical axis along which light received from said third input end is transmitted; and a fourth optical channel comprising a fourth input end that receives light from said object and a fourth output end that receives light from said fourth input end, wherein said fourth output end defines a fourth optical axis along which light received from said fourth input end is transmitted, wherein light transmitted along said first, second, third and fourth optical axes is simultaneously transmitted from said binocular-like vision system to said observer and forms a field of view comprising a vertical field of view of approximately 50 1 degrees.

29. A binocular-like vision system for enabling an observer to view an object, said system comprising:

a first optical channel comprising a first input end that receives light from said object and a first output end that receives light from said first input end, wherein said first output end defines a first optical axis along which light received from said first input end is transmitted;

a second optical channel comprising a second input end that receives light from said object and a second output end that receives light from said second input end, wherein said second output end defines a second optical axis along which light received from said second input end is transmitted;

a third optical channel comprising a third input end that receives light from said object and a third output end that receives light from said third input end, wherein said third output end defines a third optical axis along which light received from said third input end is transmitted; and a fourth optical channel comprising a fourth input end that receives light from said object and a fourth output end that receives light from said fourth input end, wherein said fourth output end defines a fourth optical axis along which light received from said fourth input end is transmitted, wherein light transmitted along said first, second, third and fourth optical axes is simultaneously transmitted from said binocular-like vision system to said observer and forms a field of view comprising a horizontal field of view of approximately 120 degrees.

30. A binocular-like vision system for enabling an observer to view an object, said system comprising:

a first optical channel comprising a first input end that receives light from said object and a first output end that receives light from said fist input end, wherein said first output end defines a first optical axis along which light received from said first input end is transmitted, a second optical channel comprising a second input end that receives light from said object and a second output end that receives light from said second input end, wherein said second output end defines a second optical axis along which light received from said second input end is transmitted, said first optical axis being angularly spaced from said second optical axis ranging from approximately 30–35 degrees; and a third optical channel comprising a third input end that receives light from said object and a third output end that receives light from said third input end, wherein said third output end defines a third optical axis along which light received from said third input end is transmitted, wherein light transmitted along said fist, second and third optical axes is simultaneously transmitted from said binocular like vision system to said observer.

31. The binocular-like vision system for enabling an observer to view an object of claim 30, said system further comprising a fourth optical channel comprising a fourth input end that receives light from said object and a fourth output end that receives light from said fourth input end, wherein said fourth output end defines a fourth optical axis along which light received from said fourth input end is transmitted, wherein light transmitted from said four optical channels is simultaneously transmitted from said binocular-like vision system to said observer.

32. A binocular-like vision system for enabling an observer to view an object during low light conditions, said system comprising:

at least three optical channels including a first optical channel comprising a first input end that receives light from said object and a first output end that receives light from said first input end, wherein said first output end defines a first optical axis along which light received from said first input end is transmitted;

a second optical channel comprising a second input end that receives light from said object and a second output end that receives light from said second input end, wherein said second output end defines a second optical axis along which light received from said second input end is transmitted; and a third optical channel comprising a third input end that receives light from said object and a third output end that receives light from said third input end, wherein said third output end defines a third optical axis along which light received from said third input end is transmitted, wherein light transmitted along said first, second and third optical axes is simultaneously transmitted from said binocular like vision system to said observer, and wherein light transmitted from said at least three optical channels forms a field of view comprising a horizontal field of view of approximately 120 degrees.

* * * * *

UNITED STATES PATENT AND TRADEMARK OFFICE
CERTIFICATE OF CORRECTION

PATENT NO. : 6,075,644
DATED : June 13, 2000
INVENTOR(S) : Danny Filipovich

Page 1 of 1

It is certified that error appears in the above-identified patent and that said Letters Patent is hereby corrected as shown below:

<u>Column 14,</u>
Line 30, replace the comma (",") with a semi-colon -- ; --.

<u>Column 15,</u>
Line 10, before the word "degrees", delete the letter "1".
Line 45, before the word "input" (second occurrence) change "fist" to -- first --.

<u>Column 16,</u>
Line 10, before the word "second", change "fist" to --first --.

Signed and Sealed this

Eighteenth Day of September, 2001

Attest:

*Nicholas P. Godici*

NICHOLAS P. GODICI
*Attesting Officer*     *Acting Director of the United States Patent and Trademark Office*